Nov. 10, 1936.  B. COHEN  2,060,725
COMBINED ARM REST AND PROTECTOR DEVICE
Filed May 6, 1936
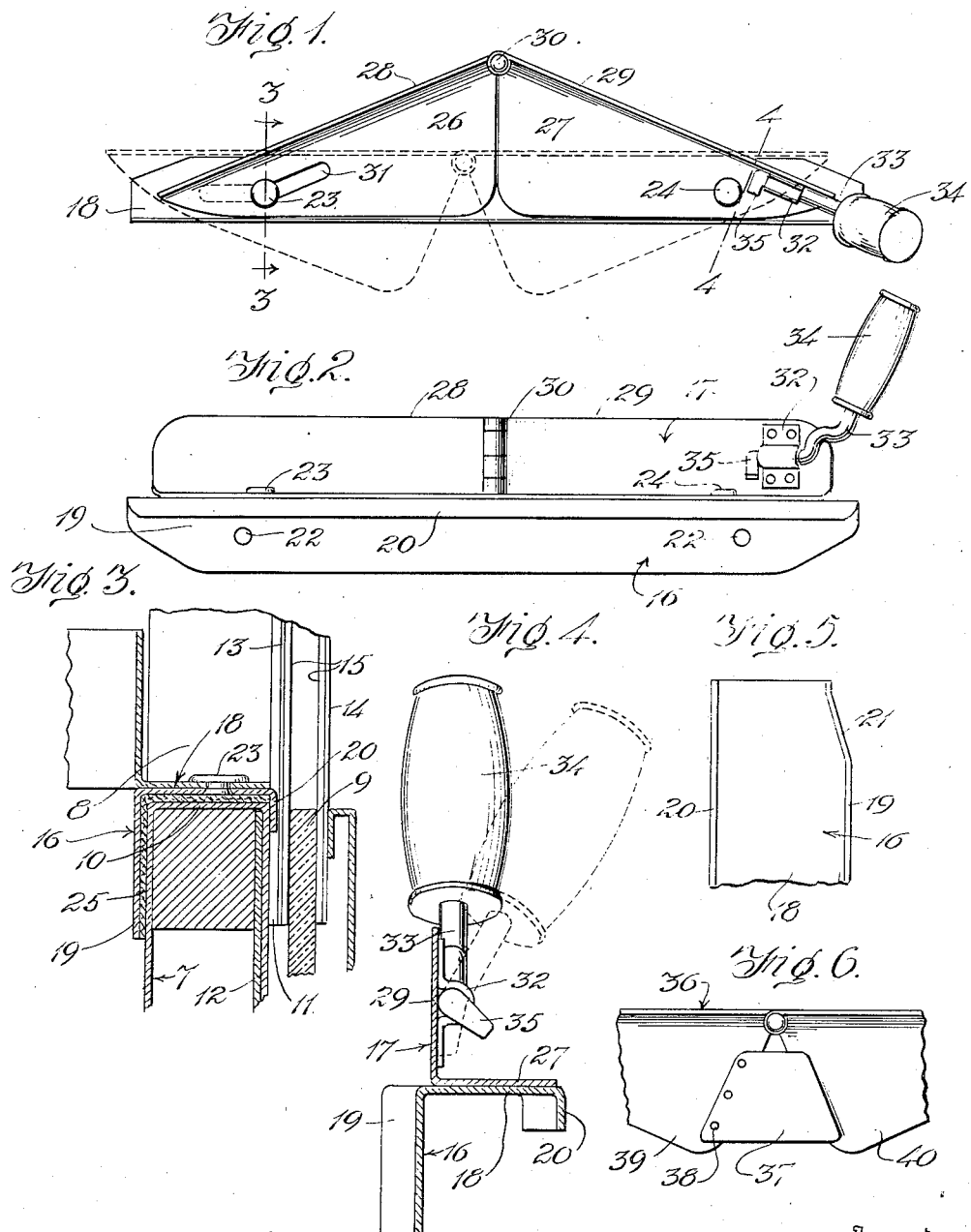
Inventor
Berry Cohen,
By Kimmel & Crowell,
Attorneys Patented Nov. 10, 1936

2,060,725

UNITED STATES PATENT OFFICE 2,060,725

COMBINED ARM REST AND PROTECTOR DEVICE

Berry Cohen, Atlanta, Ga.

Application May 6, 1936, Serial No. 78,249

9 Claims. (Cl. 155—198)

This invention relates to a combined arm rest and protector device for drivers of automobiles.

As is well known, the drivers of automobiles generally ride with their left arm resting upon and with the elbow in extended relation to the bottom of a window opening when driving, and oftentimes the arm is crushed or mutilated due to accidents, more especially on side swiping of the car.

It is the object of this invention to provide, in a manner as hereinafter set forth, an extendible, foldable device of the class referred to for mounting upon and in outwardly, extended relation to the bottom of the window opening for resting the arm of the driver, and functioning automatically, when impacted upon to fold inwardly to force the arm back inside of the car, thereby preventing danger of having the arm wedged in the window opening and crushed or mutilated.

A further object of the invention is to provide, in a manner as hereinafter set forth a device of the class referred to capable of being positioned at the bottom of a window opening of an automobile without interfering with the elevating and lowering of the window.

A further object of the invention is to provide, in a manner as hereinafter set forth, a device of the class referred to including a stationary lower section and a shiftable upper section for resting the arm and with the upper section so constructed that in case of the side swiping thereof, it will automatically fold inwardly and force the arm back inside the car thereby preventing injury to the arm.

Further objects of the invention are to provide, in a manner as hereinafter set forth, a device for the purpose referred to which is simple in its construction, strong, durable, compact, readily installed with respect to a window opening of an automobile, thoroughly efficient in use, automatic in its protecting action, and comparatively inexpensive to manufacture.

With the foregoing and other objects which may hereinafter appear, the invention consists of the novel construction, combination and arrangement of parts as will be more specifically described and are as illustrated in the accompanying drawing wherein is shown an embodiment of the invention, but it is to be understood that changes, variations and modifications may be resorted to which fall within the scope of the invention as claimed.

In the drawing:

Figure 1 is a top plan view of the device illustrated in full lines in its normal position and in dotted lines when shifted from normal, Figure 2 is an elevation looking towards the rear of the device, Figure 3 is a section on line 3—3 Figure 1 and further showing the adaptation of the device relative to the window opening of the door of an automotive vehicle, Figure 4 is a section on the line 4—4 Figure 1, Figure 5 is a fragmentary view in bottom plan illustrating the form of either end of the supporting section of the device, and Figure 6 is a fragmentary view in top plan of a modified form.

With reference to the drawing, 7 indicates a door of an automotive vehicle formed with an opening 8 closed by a vertically movable window 9 slidably mounted in the body of the door at the inner end of the opening 8. The sill of opening 8 is designated 10. The door body has an opening 11 arranged between a part 12 of the door and the outer guide strip 13 for the window 9. The inner guide strip for the window 9 is designated 14. Positioned against the opposed faces of the guide strips 13, 14 are felt strips 15. The foregoing arrangement is of known construction.

The device in accordance with this invention includes a supporting section 16 and a protecting section 17. The section 16 is disposed horizontally and the section 17 vertically upon the section 16.

The section 16 includes a top 18 of oblong contour and plan and of the desired width and length. Formed integral with the outer side of the top 18 is a vertically disposed front 19 of any suitable height. Formed integral with the inner side of the front 19 is a vertically disposed back 20 of materially less height than the front 19. The front 19 corresponds in length to the top 18 and is inturned at each end as indicated at 21. The front 19 is formed with spaced openings 22 for a purpose to be referred to. Anchored to the top 18 by its transverse median and each end is an upstanding, headed, coupling pin. The said pins are indicated at 23, 24 and are disposed substantially on the longitudinal median of the top 18. The front 19 and back 20 depend from the top 18.

When the device is coupled with the door of the vehicle, a felt body 25 is positioned on the sill 10 and depends against the outer face of the door 7 and in this connection attention is directed to Figure 3. The supporting section 16, when the device is connected with the door 7 seats upon the felt body 25 and the manner in which the parts of the supporting section is arranged, is that top 18 is seated upon that portion of the felt body 25 which is arranged upon sill 10, the front 19 is positioned against the depending portion of the felt body 25 and the back 20 depends into the opening or space 11 formed in the door body. Holdfast devices, not shown, are extended through openings 22 and engaged in the door 7 for the purpose of anchoring the device to the latter.

The protecting section 17 not only acts as a shield for the arm of the driver, but also constitutes an arm rest and it is further formed with means to provide a hand rest for the driver.

The section 17 is formed of a pair of oppositely disposed arm rest members 26, 27 of substantially triangular contour having the widest ends thereof opposing each other. The combined length of the members 26, 27 is slightly less than the top 18 of section 16. The inclined edges of the members 26, 27 are disposed outwardly. The members 26, 27 include oppositely extending, upstanding, arm protecting flanges 28, 29 which merge at their bottoms in the inclined edges of the members 26, 27 respectively. The flanges 28, 29 also constitute abutments for arresting the outward position of the arm of the driver. The members 26, 27 are of such width, that when the device is in normal position, the said members 28, 29 will be extended laterally in an outward direction relative to the top 18 of the section 16. The flanges 28, 29 of the members 26, 27 are hinged together, at their inner ends as at 30. The members 26, 27 are shiftable outwardly and inwardly in unison with respect to the top 18 of the section 16. The member 26 is formed with an inclined slot 31 through which extends the headed pin 23 and the latter provides for slidably coupling the member 26 to the top 18 of the section 16. The member 27 is pivotally connected to the top 18 of the section 16 by the headed pin 24.

The flange 29 in proximity to its outer end has its inner face formed with a keeper 32 for pivotally connecting the shank 33 of a hand rest 34 to the flange 29. The shank 33 is formed in a manner that it may be connected to the keeper 32. The hand rest 34 is arranged at the front end of the device and as it is pivoted it permits the hand of the driver, when grasping the rest to move to different positions. The shank 33 of the hand rest 34 has a depending inner end 35 which coacts with the flange 29 for limiting the inward swing of the hand rest 34. The vertical position of the hand rest 34 is illustrated in full lines in Figure 4 and the angular position of the hand rest 34 is indicated in dotted lines in Figure 4.

The normal position of the device is shown in Figure 1 and which is in projected relation with respect to the opening 8. If the device is side swiped, the protecting section thereof will be swung inwardly to the dotted line position shown in Figure 1 carrying the arm and hand of the driver therewith and due to this inward shift of the protecting section, as well as the flanges 28, 29, the arm of the driver is prevented from being wedged in the opening 8 and is prevented from being crushed or mutilated.

With reference to Figure 6 a modified form of the device is shown and which is indicated generally at 36. The device 36 is of the same construction as the form shown in Figures 1 and 2, with this exception that a plate or shield 37 is fixedly secured as at 38 to the triangular-shaped member 39 of the device 36 and slidably overlaps the triangular-shaped member 40 of the device 36. The plate or shield 37 acts to prevent any possibility of pinching of the driver's arm when the members 39, 40 are shifted to extended position.

What I claim is:

1. A device for the purpose set forth comprising a supporting section adapted to be positioned upon the sill of a window opening of an automotive vehicle, and an arm protecting and rest section superimposed on said other section and including two parts, one being slidably pivotally connected to and the other being pivotally connected to said supporting section, said protecting and rest section including means to provide for said parts being simultaneously extendible and retractible relative to the window opening.

2. A device for the purpose set forth comprising a supporting section adapted to be positioned upon the sill of a window opening of an automotive vehicle, and an arm protecting and rest section superimposed on said other section and including two parts, one being slidably pivotally connected to and the other being pivotally connected to said supporting section, said protecting and rest section including means to provide for said parts being simultaneously extendible and retractible relative to the window opening, said parts being of substantially triangular contour and arranged in oppositely disposed relation.

3. A device for the purpose set forth comprising a supporting section adapted to be positioned upon the sill of a window opening of an automotive vehicle, and an arm protecting and rest section superimposed on said other section and including two parts, one being slidably pivotally connected to and the other being pivotally connected to said supporting section, said protecting and rest section including means to provide for said parts being simultaneously extendible and retractible relative to the window opening, said parts being of substantially triangular contour and arranged in oppositely disposed relation, the said means being arranged at the wide ends of said parts and a hand rest shiftably connected to one of said members adjacent the other end of the latter.

4. In a device for the purpose set forth, a pair of oppositely disposed extendible and retractible arm protecting and rest members of angle-shaped cross section hinged together at their inner ends, a stationary support for said members, means for slidably pivotally connecting one of said members to said support, and means for pivotally connecting the other of said members to said support.

5. In a device for the purpose set forth, a pair of oppositely disposed extendible and retractible arm protecting and rest members of angle-shaped cross section hinged together at their inner ends, a stationary support for said members, means for slidably pivotally connecting one of said members to said support, means for pivotally connecting the other of said members to said support, and a hand rest shiftably connected to one of said members.

6. In a device for the purpose set forth, a pair of oppositely disposed, flat, extendible and retractible arm rest supporting members of substantially triangular form having their wide ends opposing each other, an upstanding arm protecting flange merging at its bottom in the outer edge of each member, means for hinging the inner ends of said flanges together, a stationary support, means for slidably pivotally connecting one of said members to said support, and means for pivotally connecting the other of said members to said support.

7. In a device for the purpose set forth, a pair of oppositely disposed, flat, extendible and retractible arm rest supporting members of substantially triangular form having their wide ends opposing each other, an upstanding arm protecting flange merging at its bottom in the outer edge of each member, means for hinging the inner ends of said flanges together, a stationary support, means for slidably pivotally connecting one of said members to said support, means for pivotally connecting the other of said members to said support, and a hand rest shiftably connected to one of said flanges.

8. In a device for the purpose set forth, a support adapted to be mounted in superposed relation with respect to the sill of a window of an automotive vehicle, a pair of oppositely extending, horizontally disposed, extendible and retractible members mounted upon said support, means for hinging said members together at their inner ends, means for slidably-pivotally connecting one of said members to said support, and means for pivotally connecting the other of said members to said support, each of said members including a horizontal part and a vertical part, the latter having its bottom merging into the outer side edge of the horizontal part, the said hinged means being at the inner ends of the said vertical part.

9. In a device for the purpose set forth, a support adapted to be mounted in superposed relation with respect to the sill of a window of an automotive vehicle, a pair of oppositely extending, horizontally disposed, extendible and retractible members mounted upon said support, means for hinging said members together at their inner ends, means for slidably-pivotally connecting one of said members to said support, means for pivotally connecting the other of said members to said support, each of said members including a horizontal part and a vertical part, the latter having its bottom merging into the outer side edge of the horizontal part, the said hinged means being at the inner ends of the said vertical part, an upstanding hand rest, and means for shiftably connecting the hand rest to one of said vertical parts.

BERRY COHEN.